United States Patent
Fedyk et al.

(10) Patent No.: US 7,154,851 B1
(45) Date of Patent: Dec. 26, 2006

(54) APPLICATION-AWARE RESOURCE RESERVATION IN MULTISERVICE NETWORKS

(75) Inventors: Donald Fedyk, Groton, MA (US); Billel Jamoussi, Nashua, NH (US); Sameh Rabie, Kenata (CA); Ramy M. Guirguis, Nepean (CA)

(73) Assignee: Nortel Networks Limited (CA)

( * ) Notice: Subject to any disclaimer, the term of this patent is extended or adjusted under 35 U.S.C. 154(b) by 898 days.

(21) Appl. No.: 09/906,548

(22) Filed: Jul. 16, 2001

Related U.S. Application Data

(60) Provisional application No. 60/251,442, filed on Dec. 5, 2000.

(51) Int. Cl.
*H04J 1/16* (2006.01)
*H04J 3/16* (2006.01)
*H04L 12/66* (2006.01)
*H04L 12/28* (2006.01)

(52) U.S. Cl. .............. 370/230; 370/237; 370/238; 370/252; 370/356; 370/395.43; 370/468

(58) Field of Classification Search ........ 370/230–231, 370/235–238.1, 248, 352–356, 395.21, 395.41, 370/400, 468
See application file for complete search history.

(56) References Cited

U.S. PATENT DOCUMENTS

| | | | |
|---|---|---|---|
| 5,754,530 A | 5/1998 | Awdeh et al. ............. 370/232 |
| 5,953,338 A | 9/1999 | Ma et al. ................... 370/395 |
| 5,982,748 A * | 11/1999 | Yin et al. .................. 370/232 |
| 6,490,249 B1 * | 12/2002 | Aboul-Magd et al. ..... 370/232 |
| 6,608,815 B1 * | 8/2003 | Huang et al. .............. 370/232 |
| 6,665,264 B1 * | 12/2003 | Davison et al. ........... 370/230 |
| 6,735,172 B1 * | 5/2004 | Gibbs et al. ............... 370/235 |
| 6,771,598 B1 * | 8/2004 | Andrews .................... 370/230 |
| 6,882,643 B1 * | 4/2005 | Mauger et al. ............ 370/389 |
| 6,904,017 B1 * | 6/2005 | Meempat et al. .......... 370/238 |

OTHER PUBLICATIONS

Perros, Harry G., et al "Call Admission Control Schemes: A Review", *IEEE Communication Magazine*, vol. 34, No. 11, pp. 89-91, Nov. 1996.
Rahin, Mohammad A., et al "Call Admission Control algorithms in ATM Networks: A Performance Comparison and Research Directions", *Early Draft*, Sep. 1998, ATM-MM Research Group.
Shiomoto, Kohei, et al "Overview of Measurement-Based Connection Admission Control Methods in ATM Networks", *IEEE Communications Surveys*, First Quarter 1999, pp. 2-13.

* cited by examiner

*Primary Examiner*—Chi Pham
*Assistant Examiner*—Melanie Jagannathan
(74) *Attorney, Agent, or Firm*—McGuinness & Manaras LLP

(57) ABSTRACT

Managing link bandwidth in a communication network having multiple routing devices is described. A connection path is requested across the network to establish communication from a sending process to a receiving device. Each device on the connection path is connected to a next device on the connection path by a link having an associated bandwidth. A connection admission control process is performed for at least one routing device on the connection path. A sending process reservation is determined as a function of sending process characteristics and QoS, network state, and admission policy. The application-aware reservation factor influences an amount of link bandwidth that is reserved for the sending process.

20 Claims, 3 Drawing Sheets

(a)

(b)

(c)

APPLICATION-AWARE RESOURCE RESERVATION IN MULTISERVICE NETWORKS

RELATED APPLICATIONS

This application claims priority under 35 U.S.C. §1.119(e) to U.S. provisional patent application 60/251,442, filed Dec. 5, 2000.

FIELD OF THE INVENTION

The invention generally relates to communication networks, and more particularly, to approaches for effective network link bandwidth management.

BACKGROUND ART

Communication networks must manage traffic connections intelligently to make the most effective use of finite link bandwidth. One component in an intelligent approach to link bandwidth management is a connection admission control (CAC) algorithm. When a connection request is received, CAC tries to balance the competing goals of maximizing bandwidth utilization and delivering required QoS in order to decide whether or not to accept the connection. If there are sufficient resources available to satisfy the QoS requirements of the requested new connection, as well as those of all the existing connections, CAC should accept the connection. Otherwise, it should not.

FIG. 1 shows the logical structure of a connection path across a simplified network 15. The path starts at a sending application 10 that seeks to establish communication with a designated receiving application 14. The sending application connects to the network 15 at an ingress node 11 (e.g., a router or switch; all of these terms will be used interchangeably herein to connote a physical network device that forwards data).

The ingress node 11 uses a generic CAC to estimate the likely CAC behavior of each node in the network. This takes into account both the QoS requirement of the new connection and the available bandwidth of each potential link as advertised over the network. Thus, the generic CAC allows the ingress node 11 to perform route selection for the requested connection. After the route is selected, each node along the path performs its own actual CAC; in this case, ingress node 11, intermediate node 12, and egress node 13.

One technique used by CACs is known as overbooking (or oversubscription). This refers to exploiting statistical bandwidth sharing between applications and connections, and uncertainty about the bandwidth demands of various applications. For example, not all connections or applications are active at the same time.

Link bandwidth can be partitioned into multiple pools, or shared in a single pool. Each pool can support one or more applications or QoS classes. With a single pool, also known as full sharing, there is maximum link efficiency and simplified provisioning and operations. With full partitioning, each service class (e.g., CBR, VBR-rt, VBR-nrt, UBR) has a guaranteed amount of reserved bandwidth at the cost of link fragmentation, more configuration, and routing flooding. Under a hybrid model, some service classes are combined in one pool (e.g., CBR and VBR-rt), while other service classes are in separate pools. Link overbooking is achieved by applying an overbooking factor to each pool.

But there are problems with this approach. When multiple applications share a pool, a single overbooking factor is used for all. Also, the existing pool technique is counter-intuitive; users normally think of bandwidth reservation as it relates to the actual amount of bandwidth used or required for each connection, not in terms of pool sizes. In addition, advertised available bandwidth can exceed link capacity, which is operationally confusing and may affect multi-vendor interoperability. This approach also limits the ability to tune the network traffic scheduler to suit the needs of different applications and connections (e.g., to differentiate between two VBR connections with the same traffic descriptor).

SUMMARY OF THE INVENTION

In accordance with the present invention, a sending process reservation factor that is a function of sending process characteristics is employed to facilitate determination of an amount of link bandwidth that is reserved for the sending process. Embodiments of the present invention are directed to applying an application-specific and/or QoS-specific reservation factor in conjunction with a connection admission control (CAC) algorithm. This user-configurable reservation factor can be used for overbooking link bandwidth (or underbooking the link for enhanced QoS for a particular application/traffic class), depending on operating experience and QoS needs.

The reservation factor can also be used to influence traffic scheduling behavior, which affects the actual QoS delivered to an individual application or connection. The reservation factor may also be useful for compensating for unusual traffic burstiness or correlations that are not captured by the standard CAC algorithm (for example, where many users are watching the same live TV broadcast). The reservation factor can also be used to allow for application- and media-dependent packet overhead. One example of this is Voice over ATM packets, which would require a different reservation factor than a file transfer data application because of different frame size and ATM overhead. Similarly, the reservation factor can be used to provide differentiated services to various connections sharing the same QoS class (for example, differentiating in the scheduler between 2 VBR connections having the same traffic descriptor).

The reservation factor approach avoids limitations of the prior art overbooking by pooling, and it provides a user-friendly, application-aware reservation model that ensures advertised capacity of the routing system does not exceed link capacity. Typical embodiments can be applied to any multi-service network, for example, including ATM and MPLS networks. The network may be single-level or hierarchical. The network links may be either physical (such as an ATM or POS link, or an optical path) or virtual (such as an ATM Virtual Path or an MPLS tunnel).

Initially, a connection path is requested across the network to establish communication from a sending process to a receiving device. Each routing device on the connection path is connected to a next device by a link having an associated bandwidth. A connection admission control process is performed for at least one routing device on the connection path. The connection admission control process includes determining a sending process reservation factor that is a function of sending process characteristics. The reservation factor influences the amount of link bandwidth that is reserved for the sending process.

In further embodiments, the amount of link bandwidth that is reserved for the sending process represents a portion of a bandwidth pool assigned to the sending process. The network may be, for example, an ATM or MPLS network. The link can be either physical, e.g., an ATM, POS, or optical path link; or virtual, e.g., an ATM virtual path or MPLS tunnel. The network may also be either single-level or hierarchical.

The reservation factor may be useful for tuning a traffic scheduler for influencing actual QoS delivered to the sending process. The connection admission control process can use the reservation factor to overboook or underbook link bandwidth.

The reservation factor can be determined off-line, or adaptively determined on-line. The reservation factor can also further be a function of usage statistics relevant to the sending process, link utilization, and/or an established network policy.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Representative embodiments of the present invention implement a connection admission process based on an application-aware reservation factor. In broad terms, the process is as follows:

(1) When an application sends a connection request to a network, the network edge node applies a generic connection admission control algorithm (G-CAC). Next, the edge node applies the applicable reservation factor to determine the required bandwidth.

(2) Then, the edge node selects the "optimum" network route with (likely) sufficient capacity for the anticipated bandwidth of the requested connection. As part of this process, the calculated required bandwidth is compared against the available bandwidth on each link/class in the Traffic Engineering Database (TEDB) of the edge node. (The QoS routing system is used for maintaining the TEDB, by advertising the available BW for each network link—broken down by service/QoS category for ATM P-NNI, and by class-type for MPLS/OSPF-TE. Note that the bandwidth pools model described herein is not explicitly used in this step, and may not be applicable or accurate.)

(3) Next, an actual connection admission control algorithm (A-CAC) is applied once against each link in the selected route to validate bandwidth availability and make actual reservation and connection establishment. All nodes along the route perform this function starting with the edge/ingress node. The remainder of this description focuses on the A-CAC function to provide the clearest explanation of the principles and techniques involved.

Figure 1:
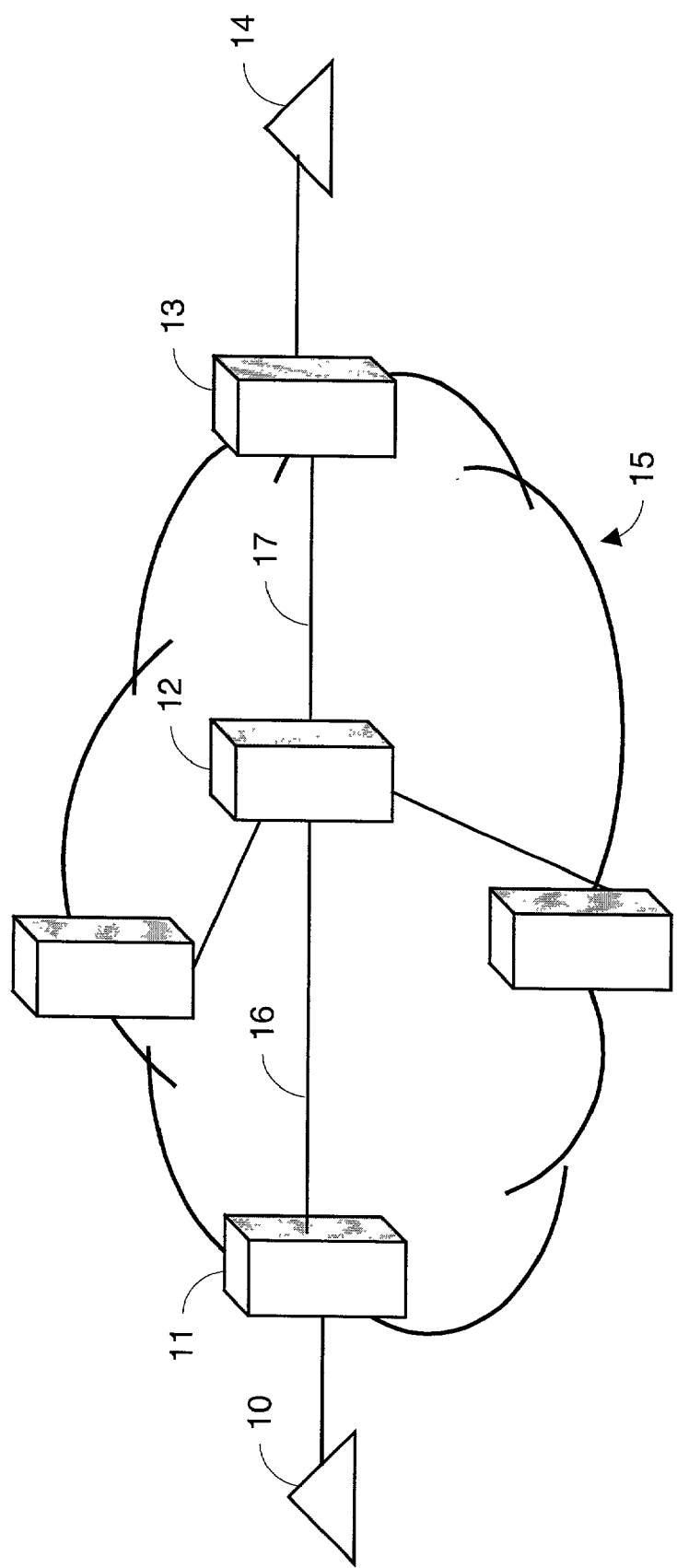
FIG. 1 shows the logical structure of a connection path across a simplified network.
Figure 2:
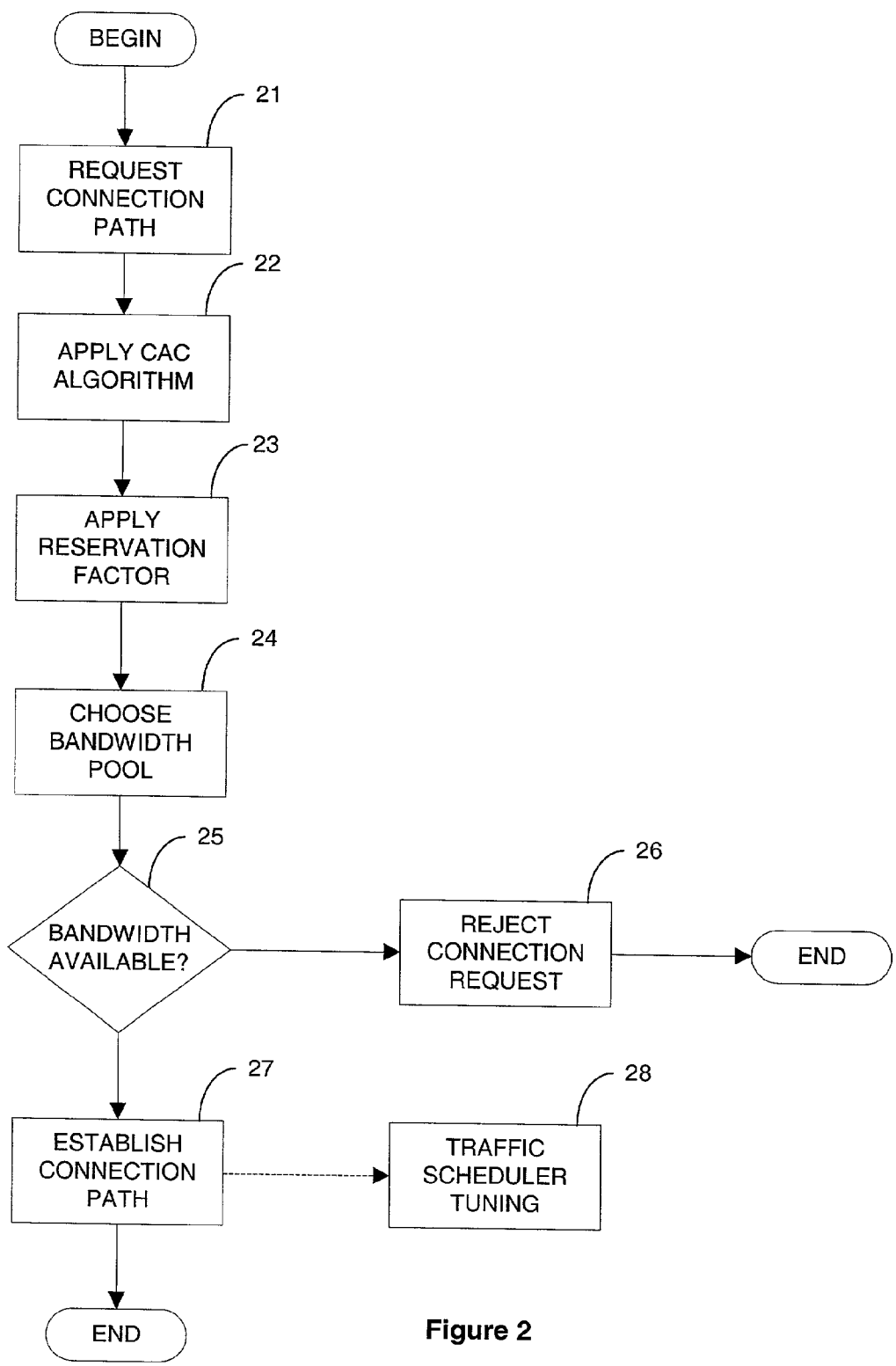
FIG. 2 shows the basic logical sequence in a connection control algorithm using a reservation factor according to a representative embodiment.

FIG. 2 shows the basic logical sequence in using a reservation factor according to a representative embodiment. Each routing device within the network has some finite amount of link bandwidth that is available. Initially, a sending process application sends a connection path request, block 21, which is received by an edge device such as the ingress node 11 in FIG. 1. The edge device then, in block 22, performs a G-CAC process, followed by application of the appropriate reservation factor, and optimum route selection throughout the network.

After applying an A-CAC algorithm (not shown), the edge device applies an appropriate reservation factor for the sending application, block 23. In one specific embodiment, a user-configurable application-specific reservation factor adjusts the CAC Equivalent Bandwidth (CAC EBW) to equal the actual bandwidth reserved for the application. Thus, in a specific application based on ATM:

CBR Reserved $BW=CAC\ EBW/CBR$ Reservation Factor

VBR-rt Reserved $BW=CAC\ EBW/VBR\text{-}rt$ Reservation Factor

VBR-nrt Reserved $BW=CAC\ EBW/VBR\text{-}nrt$ Reservation Factor

UBR Reserved $BW=CAC\ EBW/UBR$ Reservation Factor

The sending process reservation factor may be pre-configured by a user as a function of one or more sending process characteristics and influences an amount of link bandwidth that is reserved for the sending process application. In specific embodiments, the reservation factor may be adaptively determined on-line, or it may be determined off-line and stored in a look-up table. Besides being a function of characteristics of the sending process, the reservation factor may further be a function of sending process usage statistics, such as the burstiness of the sending process. Network policies may also influence the reservation factor.

Next in the connection request process, an appropriate link bandwidth pool may be chosen, block 24, where the amount of link bandwidth that is available for the sending process represents a portion of a bandwidth pool that is available to the sending process. For a shared pool arrangement where a common link bandwidth pool is shared, the prior art arrangement had a pool size that was larger than the link rate by a factor equal to the overbooking rate. By contrast, the reservation factor of representative embodiments results in the pool size typically equaling the link rate since pool overbooking is achieved by the reservation factor which is applied following CAC. Partitioned pool and hybrid pool arrangements work similarly. By using the reservation factor with the CAC, the sum of the pool sizes can be made equal to the link rate (There are times when it is desirable to allow the sum of the pool sizes to exceed link capacity without violating QoS, as described by Rabie and Guirguis in U.S. patent application Ser. No. 09/740,891, entitled "Resource Management in Multiservice Networks, filed Dec. 21, 2000, incorporated herein by reference). Thus, the reservation factor approach improves cross-vendor compatibility since the Available Cell Rate (ACR), as advertised by P-NNI for each service category, does not exceed the link rate.

At this point, block 25 determines whether enough link bandwidth is available to be reserved for the sender's request. If there is not link bandwidth available, the connection request is rejected, block 26. If there is enough link bandwidth available to provide the sender's proposed connection with the needed bandwidth, the connection is established, block 27.

Besides its usefulness to the connection admission control process, the sending process reservation factor can also be used to tune a traffic scheduler, block 28, for influencing the actual quality of service (QoS) delivered to the sending process application.

Figure 3:
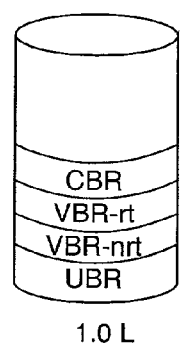
FIG. 3 shows different types of bandwidth pooling arrangements.
Figure 3:
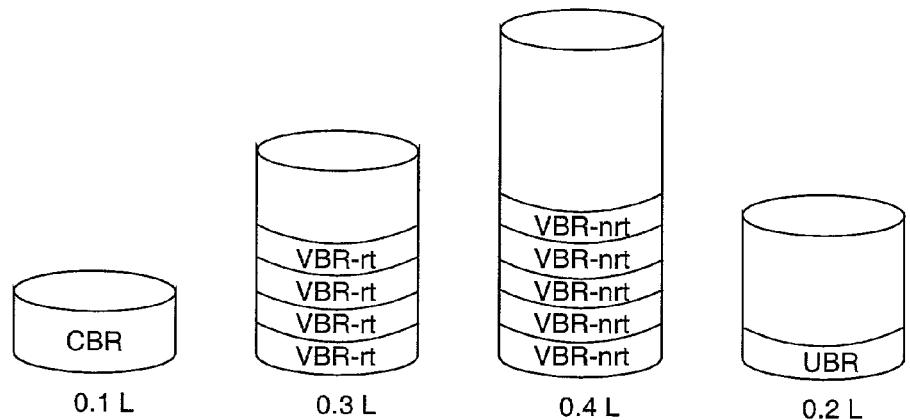
Figure 3:
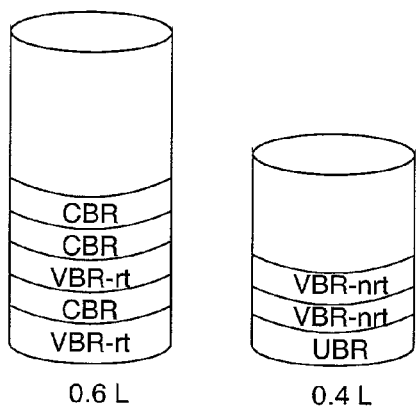

Appreciation of the reservation factor advantages can be reinforced by considering a specific example of an ATM implementation for any of the various bandwidth pooling arrangements. The simplest of these is shown in FIG. 3(a): a shared or common pool ATM implementation with no minimum bandwidth guarantee for any one service category, QoS, or class. Thus, constant bit rate (CBR), real-time variable bit rate (VBR-rt), non-real-time variable bit rate (VBR-nrt), and unspecified bit rate (UBR) traffic all draw bandwidth reservations from the same single bandwidth pool. In this arrangement, pool overbooking is achieved by CAC scaling using an independent reservation factor for each QoS. Available cell rate (ACR, which can also be thought of as available link capacity) does not exceed the link rate, and is calculated for the pool and advertised by P-NNI once for each service category. (Advertising is done once per pool/class-type in the equivalent IETF QoS routing systems OSPF-TE and IS-IS-TE, which is more efficient for shared and hybrid pools. Multiple classes can share one class-type in the IETF model.)

Of course, an ATM implementation can use a partitioned pool approach as shown in FIG. 3(b). A given bandwidth pool is reserved for each service category (CBR, VBR-rt, VBR-nrt, UBR, etc.) so that the sum of the pool sizes typically equals the link rate. As with shared pool, partitioned pools achieve overbooking through CAC scaling based on the reservation factor, per QoS. Available cell rate (ACR, or link capacity) is calculated from the available capacity of each pool and advertised by P-NNI once for each service category, ensuring that each pool/service category does not exceed link rate. This approach requires more provisioning than shared pool, causes the most bandwidth fragmentation, and has more P-NNI overhead than the shared pool arrangement, but each service category is provided at least a minimum amount of bandwidth.

A clustered or hybrid ATM pool implementation is shown in FIG. 3(c). A limited number of bandwidth pools are created, and each pool is assigned one or more service categories. For example, CBR and VBR-rt traffic might share one pool, and VBR-nrt and UBR traffic might share another pool. As with partitioned pools, in hybrid pools the sum of the pool sizes typically equals the link rate. Pool overbooking is achieved by CAC scaling using the reservation factor. Available cell rate (ACR, or link capacity) is calculated once for each pool and advertised by P-NNI once for each service category, ensuring that the pool/class-type does not exceed link rate. Thus, there is less P-NNI overhead than for the partitioned pool arrangement. There is less bandwidth fragmentation than with partitioned pool, and each pool is guaranteed at least a minimum amount of bandwidth.

A specific example may be more fully considered for an ATM-based reservation factor using hybrid pools. Each router calculates the Equivalent Bandwidth (EBW) for each incoming connection using the connection's traffic parameters, buffer size, cell loss ratio, etc., using one of the prior art actual CAC algorithms. As explained above, the reservation factor is calculated such that:

*CBR Reserved BW=CAC EBW/CBR Reservation Factor*

*VBR-rt Reserved BW=CAC EBW/VBR-rt Reservation Factor*

*VBR-nrt Reserved BW=CAC EBW/VBR-nrt Reservation Factor*

*UBR Reserved BW=CAC EBW/UBR Reservation Factor*

If the total link capacity is conveniently assumed to be 100 Mb/sec, then the pools shown in FIG. 3(c) will have 60 Mb/sec available for Pool 1 (shown=0.6 L), and 40 Mb/sec available for Pool 2 (shown=0.4 L). Further assume that the calculated EBW for each connection are:

for CBR connections=10 Mb/sec, for VBR-rt connections=20 Mb/sec, for VBR-nrt connections=40 Mb/sec, and for UBR connections=60 Mb/sec (assuming that all connections for a given service category are similar). Finally, reservation factors may be assumed as: CBR=1, VBR-rt=5, VBR-nrt=10, and UBR=20. For these specific example numbers, the following reservations are made for each connection (=EBW/Reservation Factor):

*CBR*=10/1=10 Mb/sec

*VBR-rt*=20/5=4 Mb/sec

*VBR-nrt*=40/10=4 Mb/sec

*UBR*=60/20=3 Mb/sec

If Pool 1 is as shown in FIG. 3(c), with 3 CBR and 2 VBR-rt connections admitted, then the remaining bandwidth available in Pool 1 is 60−(3*10)−(4*2)=22 Mb/sec. For Pool 2, which shows 2 VBR-nrt and 1 UBR connection, the remaining bandwidth available is 40−(2*4)−(1*3)=29 Mb/sec.

In specific MPLS implementations, different types of Label Switched Paths (LSPs) can be partitioned according to one of the various pool models. For example, E-LSPs (multi-QoS pipes) and L-LSPs (single QoS pipes) can share a single pool, or be partitioned into separate pools. Or, in a hybrid model, the L-LSPs can be further subdivided into separate pools for QoS groups (e.g., EF and AF4 in one pool, and AF3 and BE in another pool). Different reservation factors are applied to E-LSPs and for each L-LSP/QoS designation. Under such an arrangement, E-LSPs might be used for carrying best effort traffic, and L-LSPs used for carrying mission-critical and real-time applications.

Alternatively, an implementation could manage link bandwidth according to application, such as Internet Protocol (IP), Asynchronous Transfer Mode (ATM), and Frame Relay (FR), which have different usage, tariffs, and user expectations. In such a system, a different reservation factor can be applied to each application, and different applications may belong to similar or different QoS classes.

The reservation factor concept is also compatible with MPLS tunnel architectures and hierarchical bandwidth management. For example, a reservation factor-based CAC can be applied for reservations and/or overbooking at the transport layer for admitting LSP tunnels on the link, and also at the service layer for admitting application connections within transport MPLS tunnels. Such a model can be applied to both L-LSP and E-LSP tunnels.

As previously described, the reservation factor concept can also be useful in a traffic scheduler for delivering desired QoS by adjusting scheduling parameters. For example, the sum of the bandwidth reservations for a QoS class or application may be used to program the class/application weight in a weighted fair queuing (WFQ) scheduler.

Using different per-connection reservation factors can also be the basis for a traffic scheduler to provide preferential treatment to some connections within the same application/QoS class. The reserved bandwidth (accounted for by the CAC equivalent bandwidth/connection reservation factor) can be used to program the connection weight in a per-connection WFQ scheduler.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for managing link bandwidth in a communication network having a plurality of routing devices, each of the plurality of routing devices for supporting processes from a plurality of service classes the method comprising:
    assigning a plurality of reservation factors to each service class of the plurality of service classes;
    requesting a connection path across the network to establish communication from a sending process to a receiving device, each routing device on the connection path being connected to a next device by a link having an associated bandwidth; and
    performing a connection admission control process for at least one routing device on the connection path, including determining a service class associated with the sending process, and selecting a reservation factor from the plurality of reservation factors associated with service class of the sending process for assignment to the sending process, the reservation factor being selected in response to at least one characteristic of the sending process, wherein the reservation factor influences an amount of link bandwidth that is reserved for the sending process.

2. A method according to claim 1, wherein the amount of link bandwidth reserved for the sending process represents a portion of a bandwidth pool assigned to the service class of the sending process.

3. A method according to claim 1, further comprising:
    using the reservation factor to tune a traffic scheduler for influencing actual quality of service (QoS) delivered to the sending process.

4. A method according to claim 1, wherein the connection admission control process uses the reservation factor to overbook link bandwidth.

5. A method according to claim 1, wherein the connection admission control process uses the reservation factor to underbook link bandwidth.

6. A method according to claim 1, wherein the reservation factor is determined off-line and is further a function of usage statistics relevant to at least one of the sending process link utilization, and an established network policy.

7. A method according to claim 1, wherein the reservation factor is adaptively determined on-line.

8. A node device for managing link bandwidth in a communication network having a plurality of routing devices, each of the plurality of routing devices for supporting processes from a plurality of service classes the node device comprising:
    assigning a plurality of reservation factors to each service class in the plurality of service classes;
    a message processor for receiving a request for a connection path across the network to establish communication from a sending process to a receiving device, each device on the connection path being connected to a next device by a link having an associated bandwidth; and
    a connection admission control module for identifying a service class of the sending process and for selecting a reservation factor from the plurality of reservation factors assigned to the service class of the sending process, the reservation factor being selected in response to at least one characteristic of the sending process, wherein the reservation factor influences an amount of link bandwidth that is reserved for the sending process.

9. A node device according to claim 8, wherein the amount of link bandwidth that is reserved for the sending process represents a portion of a bandwidth pool assigned to the sending process.

10. A node device according to claim 8, wherein the connection admission control module uses the reservation factor to overbook link bandwidth.

11. A node device according to claim 8, wherein the connection admission control module uses the reservation factor to underbook link bandwidth.

12. A node device according to claim 8, wherein the reservation factor is determined off-line and is further a function of usage statistics relevant to at least one of the sending process, link utilization, and an established network policy.

13. A node device according to claim 8, wherein the connection admission control module adaptively determines the reservation factor on-line.

14. A computer program product stored on a computer readable medium of a computer system, the computer program being operable when executed to manage link bandwidth in a communication network having a plurality of routing devices, each of the plurality of routing devices for supporting processes from a plurality of service classes the program comprising:

program code for assigning a plurality of reservation factors to each one of the plurality of service classes;

program code for requesting a connection path across the network to establish communication from a sending process to a receiving device, each device on the connection path being connected to a next device by a link having an associated bandwidth; and program code for performing a connection admission control process for at least one routing device on the connection path, including identifying a service class associated with the sending process and selecting a reservation factor from the plurality of reservation factors associated with the identified service class of the sending process for assignment to the sending process, the reservation factor influencing an amount of available link bandwidth that is reserved for the sending process.

15. A computer program product according to claim 14, wherein the amount of link bandwidth that is reserved for the sending process represents a portion of a bandwidth pool assigned to the service class associated with the sending process.

16. A computer program product according to claim 14, further comprising:

program code for using the reservation factor to tune a traffic scheduler for influencing actual quality of service (QoS) delivered to the sending process.

17. A computer program product according to claim 14, wherein the reservation factor is used to overbook link bandwidth.

18. A computer program product according to claim 14, wherein the reservation factor is used to underbook link bandwidth.

19. A computer program product according to claim 14, wherein the reservation factor is determined off-line and is further a function of usage statistics relevant to at least one of the sending process, link utilization, and an established network policy.

20. A computer program product according to claim 14, wherein the reservation factor is adaptively determined on-line.

* * * * *